Jan. 25, 1949.   C. HUNGERFORD, JR., ET AL   2,460,011
BASE EXCHANGE WATER TREATING EQUIPMENT
Filed April 14, 1945   8 Sheets-Sheet 2

Jan. 25, 1949. C. HUNGERFORD, JR., ET AL 2,460,011
BASE EXCHANGE WATER TREATING EQUIPMENT
Filed April 14, 1945 8 Sheets-Sheet 3

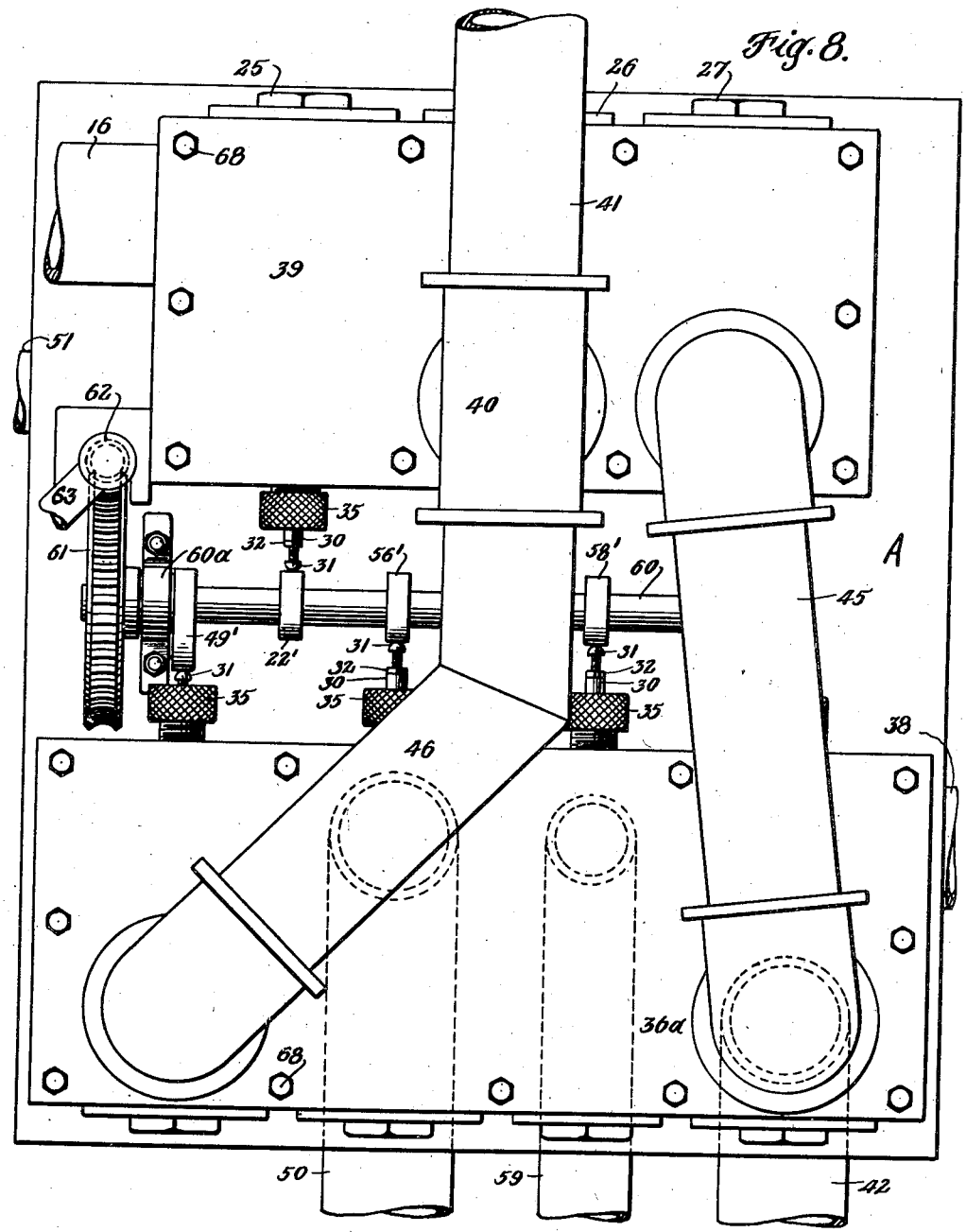

Jan. 25, 1949.   C. HUNGERFORD, JR., ET AL   2,460,011
BASE EXCHANGE WATER TREATING EQUIPMENT
Filed April 14, 1945   8 Sheets-Sheet 8
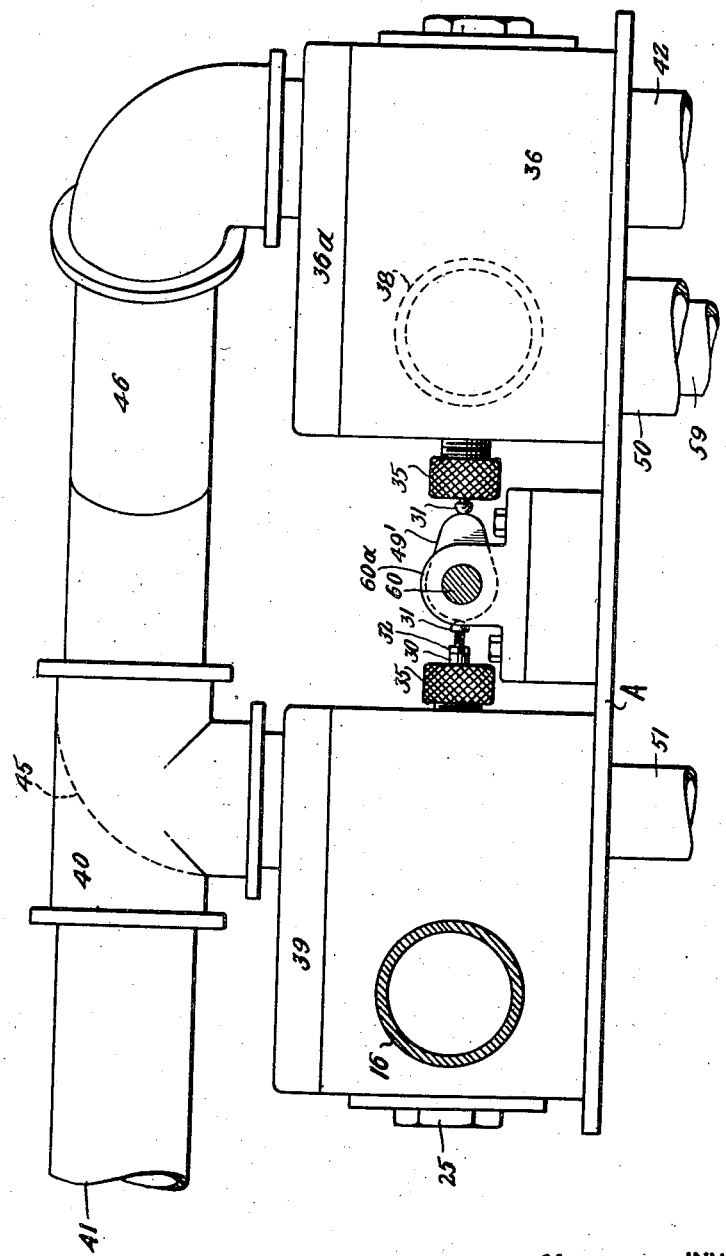

Patented Jan. 25, 1949

2,460,011

UNITED STATES PATENT OFFICE 2,460,011

BASE EXCHANGE WATER TREATING EQUIPMENT

Churchill Hungerford, Jr., Wenonah, and John G. Reutter, Clayton, N. J., assignors to Hungerford & Terry, Inc., Clayton, N. J., a corporation of Delaware Application April 14, 1945, Serial No. 588,366

16 Claims. (Cl. 210—24)

This invention relates to water treating equipment and is particularly concerned with systems which employ a base exchange medium. Systems of this kind are typified by the familiar water softening apparatus which, as is well known in the art, requires a tank for the base exchange material and, in complete installations, must also include means for supplying a regenerating material, customarily a brine or salt solution. We wish it to be understood, however, that most of the features of our invention are by no means to be limited to the art of water softening because they can be employed in various other water treating systems involving the use of either brine, acid or alkaline solutions. Nevertheless, for the sake of simplicity in disclosure, the present embodiment of the invention has been directed specifically to the art of water softening with the understanding that the constructions disclosed are applicable equally well to other types of water treating systems.

In addition to the base exchange material and the regenerating material, water treating systems require suitable piping, valves, fittings and the like in order to control the flow of the fluids through the various circuits which are necessary to supply treated water, to effect washing, regeneration or rinsing operations, as well as to dispose of waste water, brine, and/or other solutions.

The principal objects of the invention are as follows:

1. To improve the flow control mechanism in such a way as to eliminate entirely, or at least to reduce to a minimum, the possibility of cross contamination among the various circuits;

2. To provide a simplified central control mechanism for all of the fluid circuits;

3. To provide improved poppet valve mechanism for the several circuits arranged so that the poppet valves all tend to seat in the direction of the flow which greatly aids in reducing and minimizing the problems incident to leakage and cross contamination;

4. To provide removable valve seats for the poppet valves;

5. To provide improved mechanism for reducing the rate of flow in the rinsing position in order to avoid wasteful use of brine;

6. To divide the various poppet valves into two series or groups one of which is placed in what we have termed a raw water receiving unit, and the other of which in what we refer to as a water disposal unit—the two units being entirely separated from but closely adjacent to each other with the stems of the poppet valves in one unit arranged in opposed relationship to the stems of the valves in the other unit;

7. To provide a construction whereby the camshaft for operating the poppet valves can be greatly reduced in length and weight as well as to arrange for a better balance of stresses so as to reduce the weight of all associated parts and make it possible to employ fewer bearings for the camshaft;

8. To provide an arrangement whereby the stems of the poppet valves can be operated by a pushing action rather than a pulling action so as to provide for easy adjustability of the stems and thereby render it more simple to control the degree of opening of the valves as well as to compensate for any wear which may occur, and in general to provide for greater compactness, accessibility, convenience and reduction in manufacturing as well as maintenance costs.

How the foregoing objects, together with such other objects as may appear hereinafter, or are incident to our invention, are attained, is illustrated in the accompanying drawings which represent a typical and preferred embodiment designed especially for the softening of hard water.

Figure 1a is a somewhat enlarged sectional view illustrating the details of an injector which can be used to pick up the regenerating solution;

Figure 8 is a plan view of the valve units; and

Figure 9 is an elevational view taken from the left of Figure 8.

Figure 1:
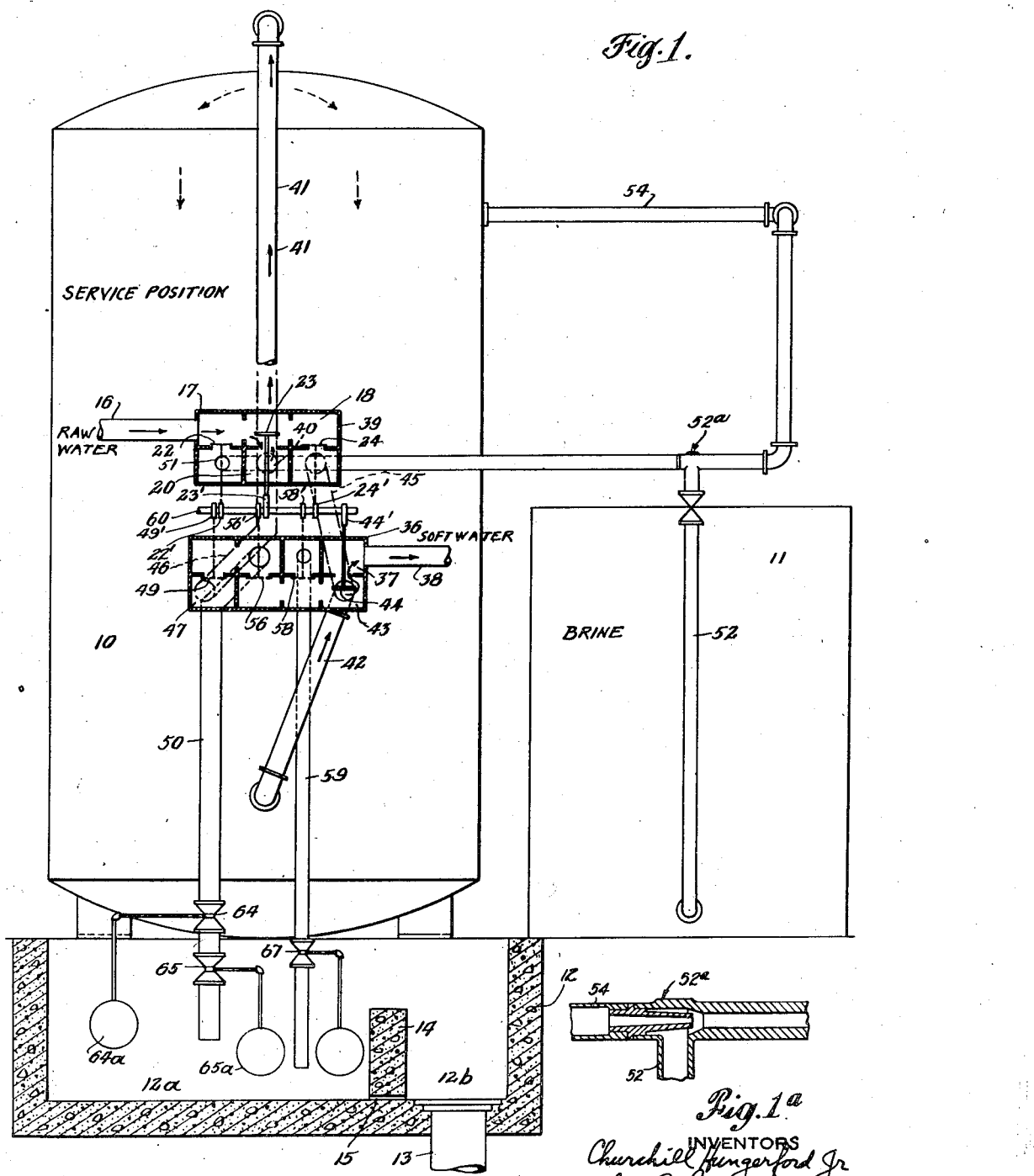
Figure 1 is a diagrammatic view of a base exchange water softening system which incorporates the several features of our invention with the valves and their controlling mechanism shown in the positions which they occupy during service operation of the system.

Before proceeding to a detailed description of the drawings, we wish to note the fact that in Figures 1 to 4 inclusive, the valve units are shown in a purely diagrammatic way for the sake of simplicity in illustration.

The water softening system which we have illustrated employs a base exchange filter 10, a brine tank 11 and a waste sump 12 for connection to a sewer through the drain 13. The sump is divided into an inlet compartment 12a and an outlet compartment 12b which are separated from each other by a weir 14 through the bottom of which is a relatively small drain passage 15, so that the inlet compartment 12a may be completely emptied. However, the capacity of the passage 15 must not be so great as to prevent the compartment 12a from filling during a washing or rinsing operation as will further appear.

Figure 7:
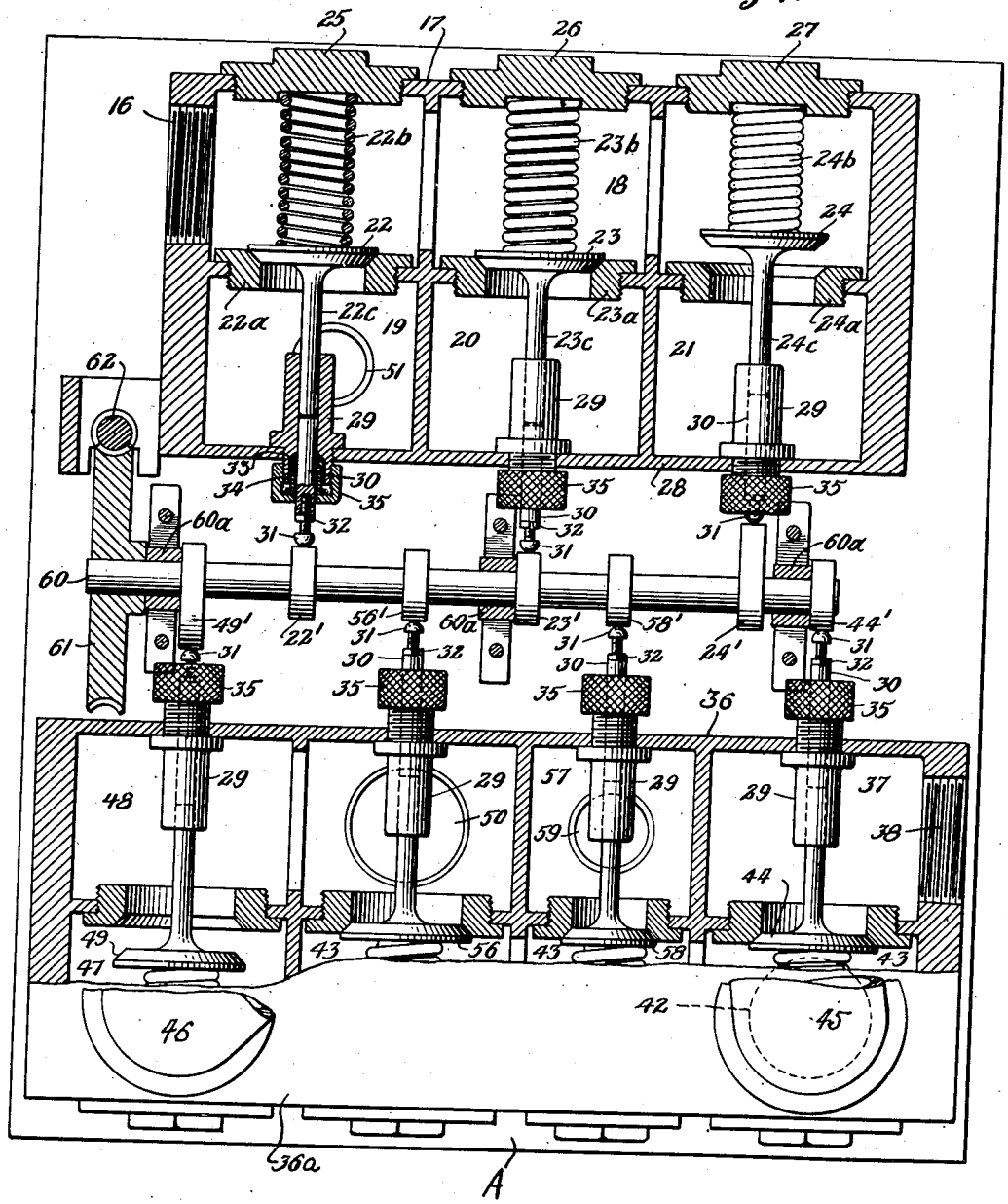
Figure 7 is a horizontal section through the two valve units showing certain details of the construction.

The raw water comes in through the inlet 16, entering what we have termed the raw water receiving unit 17. This unit is mounted upon the base plate A and is divided into an entrance or receiving chamber proper 18 and a series of three distributing chambers 19, 20 and 21. (See Fig. 7.) Communication between the chamber 18 and each of the distributing chambers is controlled by the poppet valves 22, 23 and 24 which are adapted to seat against the members 22a, 23a and 24a as clearly indicated to best advantage in Figure 7. The valves, therefore, seat in the direction of flow and in addition we provide the coil springs 22b, 23b and 24b which react between the backs of the valves and the removable plug members 25, 26 and 27, the latter providing access to the valves and their seats.

The stems of the poppet valves 22, 23 and 24, indicated respectively by the reference characters 22c, 23c and 24c, project outwardly toward suitable openings in the wall 28 of the raw water receiving unit. Each of them fits into a bushing 29 which is screwed into an opening in the wall 28 and in this bushing they abut against a tappet rod 30 which has an adjustable head in the form of a screw 31 which is held in place by a locknut 32. Each of the separate tappets 30 is suitably packed as by the packing 33, gland 34 and knurled follower nut 35.

On the base plate A in close proximity to the raw water receiving unit we have arranged what we refer to as a water disposal unit 36 which unit, as will be seen, is separated from and entirely independent of the receiving unit so as to eliminate the possibility of cross contamination as well as to provide for compactness and accessibility. The disposal unit has a disposal compartment 37 from which the softened water is delivered to the outlet pipe 38.

As illustrated in Figure 1, the circuit for the service water is established through the entrance chamber 18, past the valve 23 into the distributing chamber 20, then upwardly through the cover plate 39 into the T-pipe 40 and from thence through the pipe 41 to the top of the base exchange filter 10. After passing down through the base exchange material in the manner well known to this art, the hard water becomes softened and is collected near the bottom at a point below the head of the base exchanging material passing outwardly through the pipe 42 which delivers to the receiving compartment 43 in the water disposal unit 36. From the compartment 43 under the control of the poppet valve 44 the soft water passes into the disposal compartment 37 and thence to the service main 38, as already described.

Figure 2:
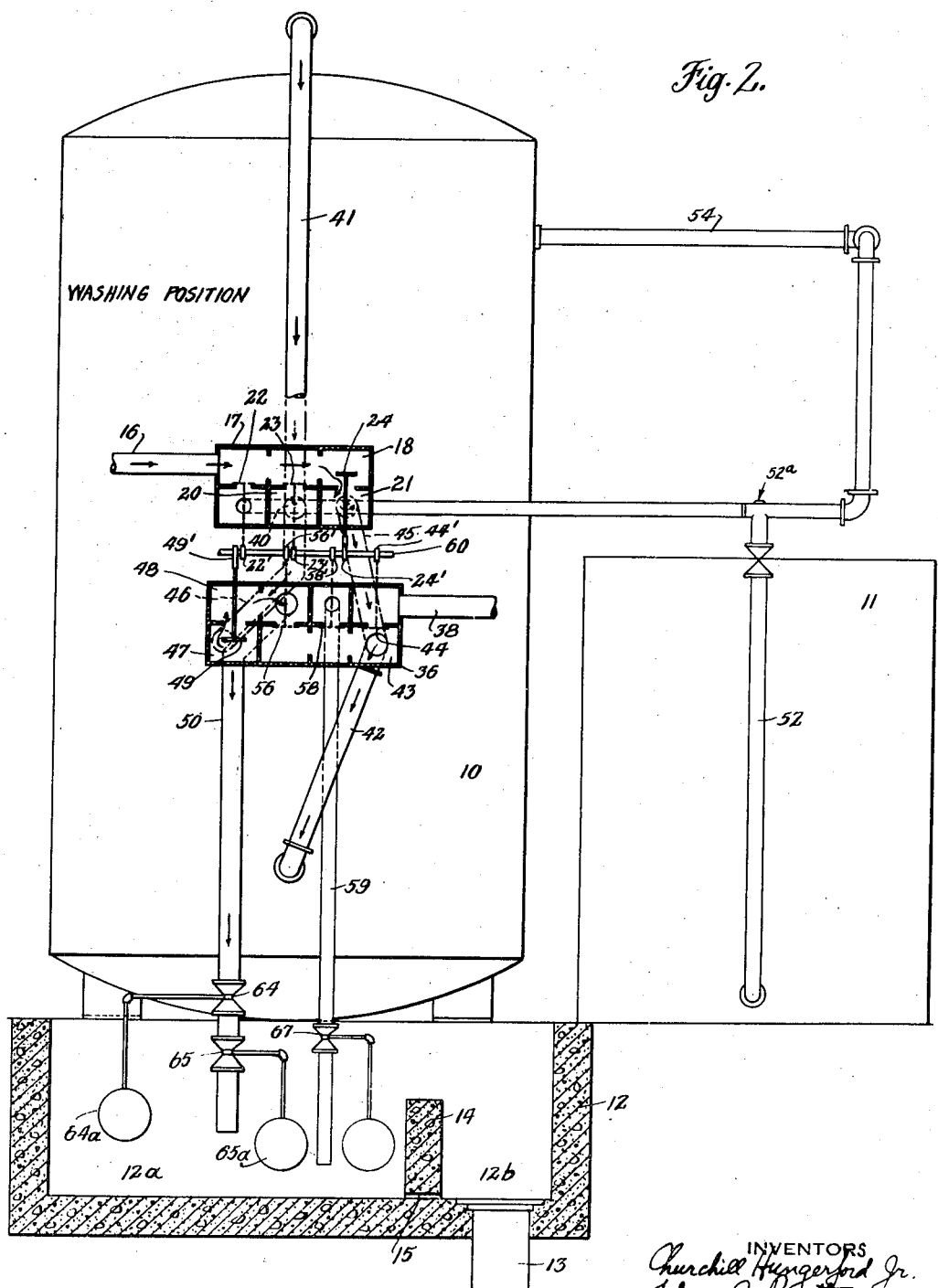
Figure 2 is a view similar to Figure 1 but illustrating the parts in the positons they occupy during wash position.

After the service operation and before regeneration of the base exchange material, it is customary to wash the base exchange filter and the circuit for accomplishing this is diagrammatically illustrated in Figure 2. Raw water from the entrance chamber 18 passes into the distributing chamber 21 under the control of poppet valve 24. From the chamber 21 this raw water passes upwardly through another opening in the cover plate 39 and into the pipe 45 which delivers to the receiving compartment 43 of the disposal unit 36 through the cover member 36a thereof. At this time, as will further appear, the service poppet valve 44 is closed and the wash water enters the pipe 42 and is delivered to the bottom of the base exchange filter below the base exchanging material and then passes upwardly therethrough to come out at the top through the pipe 41 which connects through the pipe 40 to the pipe 46, poppet valve 23 being closed as will more fully appear hereinafter. The pipe 46 delivers to the receiving compartment 47 from whence it passes to the waste or disposal compartment 48 under the control of poppet valve 49. From the compartment 48 discharge to waste is effected through the pipe 50 which delivers to the receiving side 12a of the sump 12.

The flow of waste water is controlled in a special manner by means of the mechanism illustrated in Figures 5 and 6 which, however, will be described in detail later on because it is desired to complete the description of the several circuits before entering into that phase of the invention.

Figure 3:
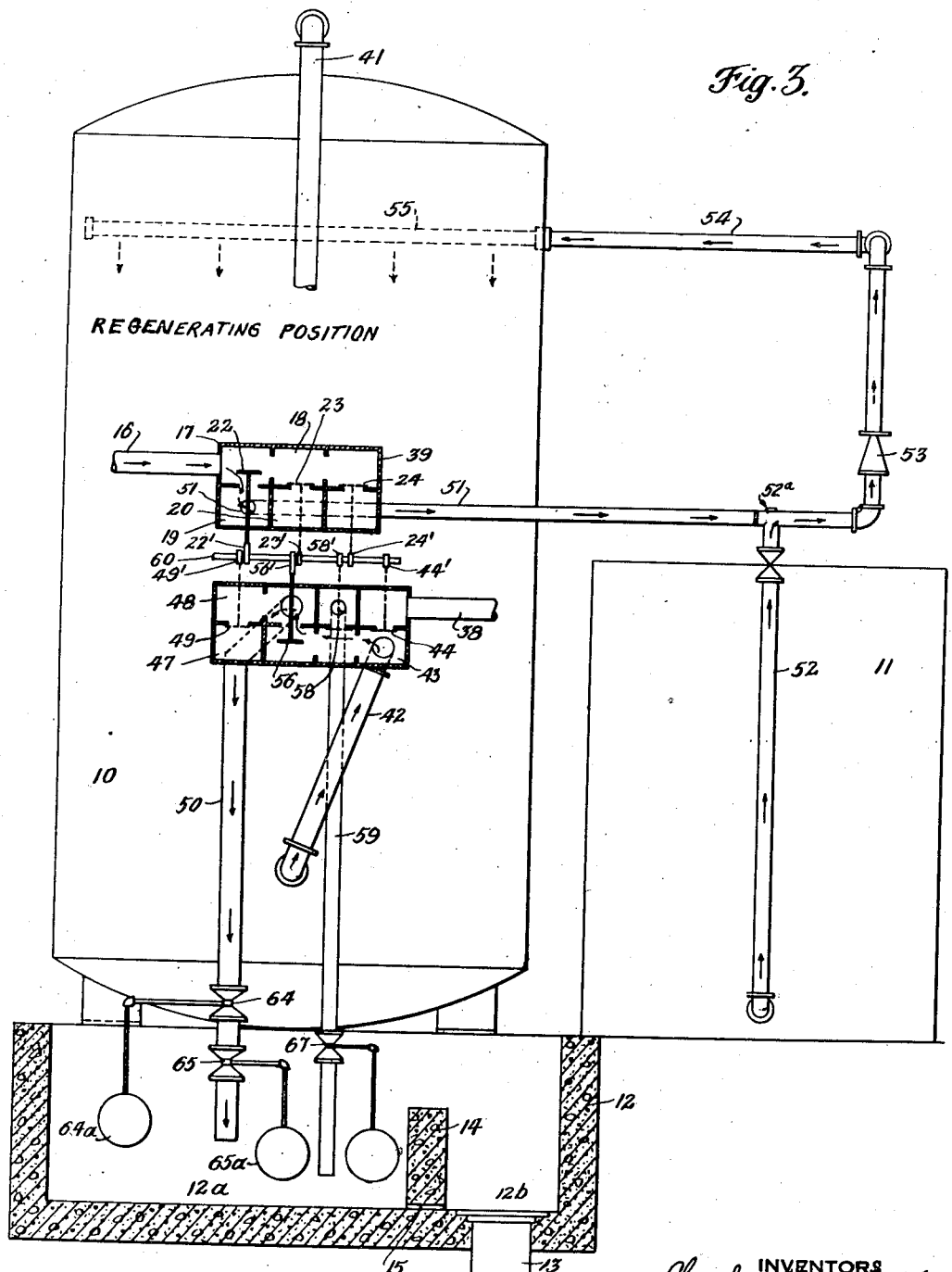
Figure 3 is another view similar to Figures 1 and 2 but showing the parts in regenerating position.

When the washing operation is completed regeneration is effected and the circuits for this operation are illustrated in Figure 3. The raw water coming in through the entrance chamber 18 passes into the distributing chamber 19 under the control of valve 22 and from the chamber 19 it is carried by means of the pipe 51 to a junction with the pipe 52 coming from the regenerating solution or brine tank 11. By means of an injector 52a, the brine solution is picked up by the water in whatever proportion is desired, passes through the check valve 53 and then through the pipe 54 to a distributing manifold 55 located in the exchange filter 10 at a point above the base exchange bed. The brine then passes downwardly through the filter and at the same time the water trapped in the filter 10 is collected at the bottom, entering the pipe 42 and compartment 43 from whence it flows to disposal compartment 48 under the control of poppet valve 56. From the compartment 48, of course, it passes to waste pipe 50 and thence to the sump. After the regenerating step the filter is subjected to a rinsing operation which is effected in an improved manner as will now be described in connection with Figure 4.

The raw water from the entrance chamber 18 passes the valve 23 and enters the distributing chamber 20 from whence it travels to the top of the exchange filter 10 through the pipes 40 and 41. It then filters downwardly through the base exchange bed forcing the spent brine out and into the pipe 42 which delivers to the compartment 43 and from thence to the disposal compartment 57 under the control of valve 58. From compartment 57 discharge to waste is effected through the pipe 59 which delivers into the receiving side 12a of the sump 12.

The three poppet valves 22, 23 and 24 in the water receiving unit 17, it will be seen, constitute one series of control valves with their stems projecting toward the actuating cam shaft 60. Arranged with their stems in opposing relationship is the other series of poppet valves 44, 49, 56 and 58 in the water disposal unit 36. The stems of this other series of poppet valves are constructed, arranged and packed in exactly the same manner as are the stems in the first series so that a detailed description thereof will not be included.

From left to right, the cam shaft 60 is equipped with a series of cams 49', 22', 56', 23', 58', 24' and 44' which actuate, respectively, the valves 49, 22, 56, 23, 58, 24 and 44. The cam shaft is mounted in a series of three bearings 60a and the cam is rotated in any desired manner as by the pinion 61 and worm 62, power being supplied to the latter through the crank 63. In practice the cam shaft will be power driven and timed for operation to suit the needs of the installation but the details of this mechanism are not illustrated herein since, per se, they form no part of the present invention. Suffice it to say for the present disclosure that the various cams on the shaft 60 are contoured and positioned so as to open or permit closure of the various valves for periods of time and in the sequence necessary to establish the circuits already described which will be briefly summarized as follows.

During service position of the parts as illustrated in Figure 1 the cam shaft will turn the cams 23' and 44' to the position necessary to open valves 23 and 44 while all the rest of the cams will be moved to a position which permits all the other valves to close. In the wash position illustrated particularly in Figure 2 the cam shaft will have turned to a position where the cams 24' and 49' have opened the valves 24 and 49 while all the rest of the cams are in positions which permit the balance of the valves to remain in closed position. In the regenerating cycle of operation as illustrated particularly in Figure 3 the position of the cam shaft will cause cams 22' and 56' to open, respectively, the valves 22 and 56 while all the rest of the valves will remain in closed position. Finally, in the rinsing position illustrated particularly in Figure 4, the cam shaft will have been rotated to a position where cams 23' and 58' have opened valves 23 and 58 while the balance of the valves remain in closed position.

Figure 5:
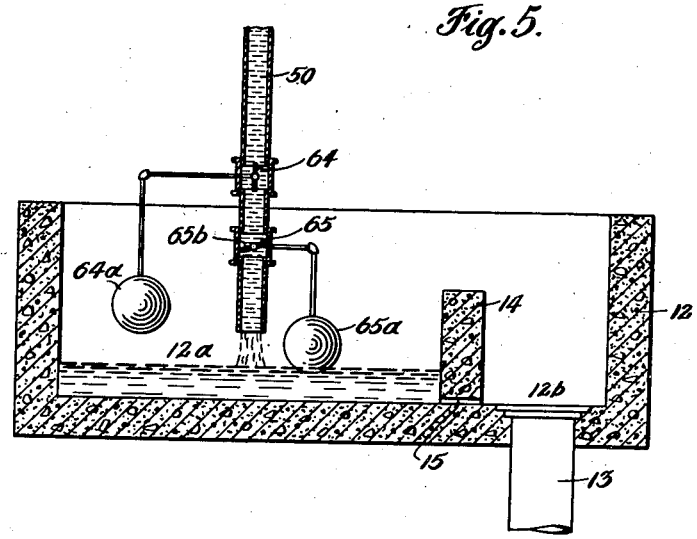
Figure 5 is a section through the waste sump showing the valves which control the discharge of the wash water in the position which they occupy at the time that the washing operation is just beginning.
Figure 6:
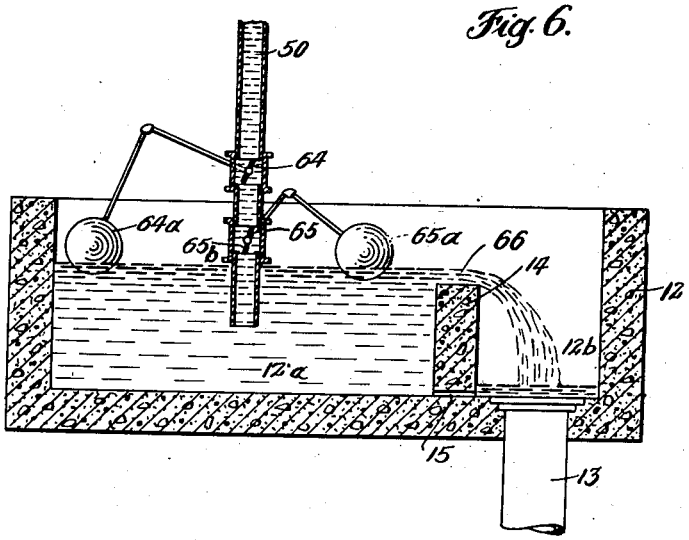
Figure 6 is a view similar to Figure 5 but showing the positions which the parts assume during the height of the washing operation.

We will now describe the improved means which we have provided for controlling the flow of the wash water and in this connection attention is directed particularly to Figures 2, 5 and 6. In equipment heretofore familiar to the art the washing step has frequently given rise to considerable difficulty with the gravel and base exchange beds customarily employed in the filter 10. For example, during the washing step these beds have been seriously disturbed by a too rapid introduction of the wash water especially in the initial stages of the washing cycle. The beds are disturbed and upset so that excessive quantities of base exchange material and/or filter sand are carried out with the wash water and discharged from the unit into the sewer. In addition, the finer layers of gravel are shifted or disturbed so as to permit the base exchange material and/or the filter sand to trickle down through the coarser layers of gravel which have remained more or less intact. When this occurs and the unit is again placed in service such fine particles are passed into the treated or softened water line. We overcome these difficulties in the following way.

In the lower end of the pipe 50 which discharges to waste through the inlet side 12a of the sump 12, we place two valves 64 and 65 in series. These valves, preferably, are of the butterfly type as shown to best advantage in Figures 5 and 6. The valve 64 is controlled by a float 64a and the valve 65 by a float 65a.

The lower valve 65 is constructed so that it will pass a relatively small amount of water even when the valve is substantially closed and provision for this can be effected in any desired manner as by making the valve a loose fit in the pipe or by drilling a small hole 65b in the fin of the valve.

At the beginning of the washing operation, of course, both sides of the sump 12 are empty, the inlet side 12a draining to the waste pipe 13 through the opening 15 at the bottom of the weir 14. When the washing cycle is begun both floats will be in their lower positions (Fig. 5) with the first valve 64 open and the second valve 65 closed except for the relatively small flow which can take place either through the openings 65b or past the valve itself in accordance with the description already given. This disposition of the valves will prevent a sudden flow or surge of a large volume of water through the filter 10 because all the water that can pass out through the waste pipe 50 is that relatively small quantity which flows through the port 65b. The flow past the valve 65, however, must be greater than the flow through the drain 15 under the weir 14 so that the inlet compartment 12a of the sump can slowly fill with water. As it fills the floats 64a and 65a will rise and as they rise the valve 64 will be moved toward a closed position while the valve 65 will be moved toward its fully open position. This operation proceeds until the receiving side 12a is filled with water and a predetermined volume of flow takes place over the top of the weir 14 as indicated at 66 in Figure 6. It will be understood, of course, that this volume may be as large as necessary but at no time will it have been attained by a sudden surge but only by a gradual opening of the valve 65 in proper correlation to a partial closing of the valve 64. For any given installation experience will quickly demonstrate what volume of water should pass over the weir 14 in order to effect the washing operation in the time and with the thoroughness desired while at the same time avoiding excessive or troublesome disturbances of the gravel and water softening beds.

Figure 4:
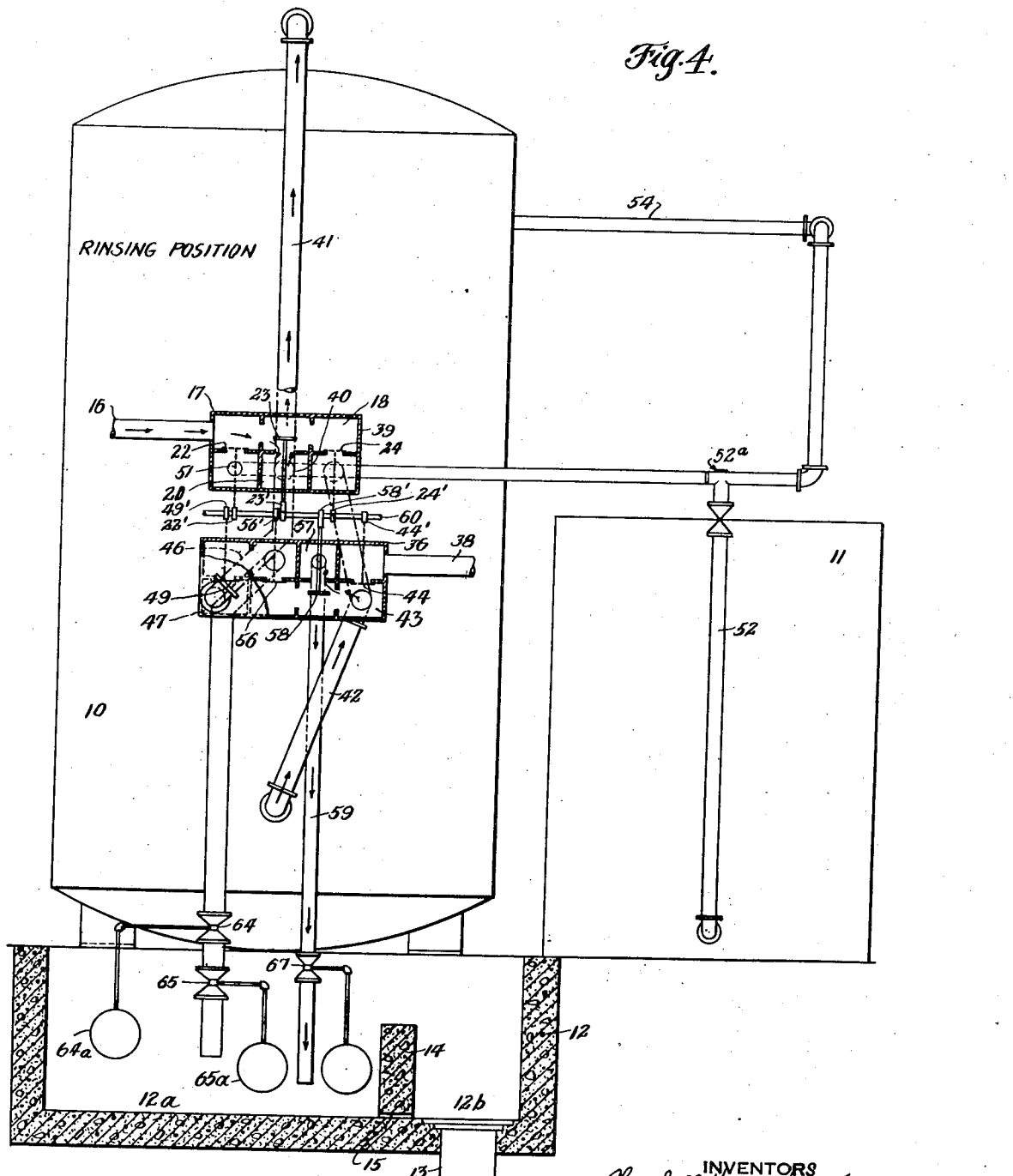
Figure 4 is a view similar to Figures 1, 2 and 3 but showing the parts in rinsing position.

Our invention also contemplates an improved method of controlling the flow during a rinsing operation such as is illustrated particularly in Figure 4. In order to avoid passing the brine too rapidly through the exchange material which is exceedingly wasteful of brine, we cut down the rate of flow during the rinsing operation by effecting discharge to waste through an entirely separate and very much smaller waste pipe 59 as already described. As will be seen in Figure 7, the valve 58 which controls the pipe 59 is of very much smaller diameter than the other valves in the controlling system. In fact, the capacity of the valve 58 and the pipe 59 is generally kept at approximately one-third the rate of flow through the wash pipe 50 and valve 56. In addition, there is a float controlled valve 67 in the pipe 59 which will permit a much less volume of flow over the weir than does the double valve control for the pipe 50.

The mechanism within the two water units 17 and 36 is made readily accessible simply by removing the cover plates 39 and 36a which, as indicated in Figure 8, are secured in position by the studs 68. Furthermore, the covers can be so removed by breaking only one pipe joint, namely a joint in the pipe 41, which can be located immediately adjacent the T-pipe 40 or slightly to one side of the unit 17. The sections of pipe 40, 45 and 46 and the section of pipe 41, if the joint is provided at the side of the unit 17, can all remain in position on the cover plates 39 and 36a so that the cover plates and these sections of pipe are all handled and removed or replaced as a unit.

In conclusion, we wish to refer briefly to the various advantages which are secured by our invention. The division of the controlling valves for the various circuits into two series which are independently housed yields a degree of compactness, accessibility and convenience not heretofore attained in any of the prior structures with which we are familiar. In addition, it makes possible the employment of lighter weight castings and the use of a shorter and lighter weight cam shaft as well as of fewer bearings for the latter. Furthermore, the stresses imposed on the cam shaft are in better balance by virtue of the opposed arrangement of the two series of poppet valves. Our improvements also make possible the employment of an arrangement wherein the stems of the poppet valves are pushed to effect an opening operation rather than pulled, which in turn makes possible the very simple adjustable stem feature which we have disclosed.

The division of the valve control mechanism into two units also reduces to an absolute minimum all possibility of cross contamination between the various flow circuits, which is particularly valuable insofar as the regenerating circuit is concerned. By our invention we pick up the regenerating solution on the way to the treating unit so that the fresh solution is never passed through any of the valves in the control units. Instead only the spent solution ever reaches the valve mechanism and even this is handled through an entirely independent valve and a separate pipe, namely the valve 58 and the pipe 59.

At the same time that all of the foregoing advantages are secured our invention also makes possible the employment of a central control mechanism for all of the fluid circuits wherein all of the valves are operated by a single cam shaft. This is a feature of great importance to the successful operation of our improved base exchange water treating equipment.

We claim:

1. In base exchange water treating equipment, flow control mechanism comprising a raw water receiving unit; a water disposal unit adjacent to but separated from the raw water receiving unit; a series of poppet controlling valves in each of said water units with the valve operating stems of the two series arranged in opposed relationship; and a cam shaft lying between and adapted to open all of said valves in the required combinations and sequence.

2. In base exchange water treating equipment, flow control mechanism comprising a valve unit for receiving and directing the flow of the incoming raw water; a separate valve unit for delivering wash water and treated water and for effecting discharge to waste of wash water, spent regenerating solution and rinse water; a series of poppet valves in each valve unit; and a valve actuating cam shaft lying between said valve units in position to control all of the poppet valves in both units.

3. The equipment of claim 2 wherein the valve stems are adjustable.

4. The equipment of claim 1 wherein the valve stems are adjustable.

5. Equipment according to claim 1 wherein the water units are each provided with a removable cover plate through which connection between units is effected.

6. Equipment according to claim 1 wherein the water units are each provided with a removable cover plate through which connection between units is effected and wherein the cover plates with their interconnection are removable as a unit without disturbing the poppet valves or the cam shaft.

7. Equipment according to claim 1 wherein said poppet valves close in the direction of flow.

8. Equipment according to claim 1 wherein said poppet valves close in the direction of flow and are opened by pushing on the valve stems.

9. In base exchange water treating equipment having a base exchange filter and a regenerating solution supply unit; flow control mechanism comprising a raw water receiving unit; a water disposal unit adjacent to but separated from the raw water supply unit; connections between the raw water supply unit and the top of the base exchange filter, the regenerating solution supply unit and the water disposal unit; poppet valves controlling said connections; a connection between the water disposal unit and the bottom of the base exchange filter; a connection between the disposal unit and a point of waste; a connection between the disposal unit and a service line; poppet valves in said disposal unit for controlling each of said disposal unit connections; a cam shaft lying between the raw water supply unit and the water disposal unit; and cams on said cam shaft for opening all of said poppet valves in the required combinations and sequence.

10. In base exchange water softening equipment having an exchange filter, a regenerating solution supply tank and a waste pipe; flow control mechanism comprising a raw water supply unit; a water disposal unit; a series of connections between said units and the filter, regenerating solution tank and waste pipe; a connection between the two water units; a series of poppet valves in each unit for controlling said connections with the stems of the valves in one unit arranged in opposition to the stems of the valves in the other unit; and a cam shaft lying between said units in position to actuate said valve stems.

11. In base exchange water softening equipment, a base exchange filter, a regenerating material supply vessel, a sump, a weir dividing the sump into a receiving chamber and a drain chamber, a connection for introducing raw water into the exchange filter, a connection for delivering softened water from the filter, a wash water discharge connection from the filter to the receiving chamber of the sump, a separate discharge connection of substantially less capacity than the wash water discharge connection for delivering spent regenerating material to the receiving side of the sump, valve means for each of said discharge connections, and means for controlling said valve means in accordance with the level of the liquid in the receiving chamber of the sump.

12. In base exchange water treating equipment where the wash water is passed upwardly through the exchange filter, the combination of a wash water sump, a pipe for discharging the wash water into said sump, a drain from the sump, a weir across which the water must flow before passing out through the drain, a pair of valves arranged serially in the pipe, and means for controlling said valves by the level of the water in the sump, the final valve being substantially but not quite closed and the first valve being open when the sump is empty and said final valve being opened and the first valve being partially closed as the sump fills with water, whereby a substantially constant volume of flow across the top of the weir and thence to the drain may be established and maintained.

13. In base exchange water treating equipment the combination of a base exchange filter, a connection for passing wash water into the filter below the exchange material, a connection for withdrawing the wash water from the filter above the exchange material, a wash water sump, a connection for delivering the withdrawn wash water into the sump, a drain from the sump, a weir separating the receiving side of the sump from the drain side, valve means in the delivery pipe constructed to pass a relatively small volume of water when the receiving side of the sump is empty, a float adapted to open said valve gradually as the receiving side of the sump fills with water, a second valve means in the delivery pipe in advance of said first valve means, said second valve means being open when the receiving side of the sump is empty, and a second float adapted to close said second valve partially as the wash water rises in the receiving side, whereby a substantially constant volume of flow across the top of the weir and thence to the drain may be established and maintained.

14. In water treating equipment, flow control mechanism comprising a raw water receiving unit having an entrance chamber and a series of distributing chambers at one side thereof; a water disposal unit adjacent to but spaced from said receiving unit, said disposal unit having a receiving compartment and a series of disposal compartments at the side thereof which faces the series of distributing chambers in the raw water receiving unit; an opening between said entrance chamber and each of said distributing chambers and between said receiving compartment and each of said disposal compartments; a poppet valve for controlling each of said openings arranged with its stem projecting into the space between said water units, all of said valves being adapted to seat in a direction toward said space; and a cam shaft lying between and adapted to open all of said valves in the required combinations and sequence.

15. In base exchange water treating equipment having a base exchange filter and a regenerating material supply unit; flow control mechanism comprising a raw water receiving unit having an entrance chamber and a series of distributing chambers at one side thereof; a water disposal unit adjacent to but spaced from said receiving unit, said disposal unit having a receiving compartment and a series of disposal compartments at the side thereof which faces the series of distributing chambers in the raw water receiving unit; an opening between said entrance chamber and each of said distrbuting chambers and between said receiving compartment and each of said disposal compartments; a valve for controlling each of said openings, an operating stem for each of said valves arranged to project into the space between said water units; operating mechanism in said space adapted to open all of said valves in the required combinations and sequences; connections between the raw water supply unit and the top of the base exchange filter, the regenerating material supply unit and the water disposal unit, the connection with the regenerating material supply unit being connected also to the top of the base exchange filter whereby raw water is enabled to convey regenerating material to the base exchange filter; a connection between the water disposal unit and the bottom of the base exchange filter; a connection between the disposal unit and a point of waste; and a service line connection to the disposal unit.

16. Flow control mechanism in accordance with claim 15 wherein the valves are poppet valves arranged to seat in the direction of fluid flow and wherein the operating mechanism is a cam shaft lying in the space between the units.

CHURCHILL HUNGERFORD, Jr.
JOHN G. REUTTER.

REFERENCES CITED

The following references are of record in the file of this patent:

UNITED STATES PATENTS

| Number | Name | Date |
|---|---|---|
| 1,443,892 | Applebaum | Jan. 30, 1923 |
| 1,605,652 | Dotterweich | Nov. 2, 1926 |
| 1,652,710 | Dotterweich | Dec. 13, 1927 |
| 1,661,676 | Norquist | Mar. 6, 1928 |
| 1,721,105 | Dotterweich | July 16, 1929 |
| 1,759,636 | Turner | May 20, 1930 |
| 2,012,194 | Hughes | Aug. 20, 1935 |
| 2,042,178 | Lauterbur et al. | May 26, 1936 |
| 2,051,155 | Staegemann | Aug. 18, 1936 |
| 2,338,667 | Riche | Jan. 4, 1944 |

Certificate of Correction

Patent No. 2,460,011. January 25, 1949.

CHURCHILL HUNGERFORD, Jr., ET AL.

It is hereby certified that errors appear in the printed specification of the above numbered patent requiring correction as follows:

Column 3, line 74, for the word "head" read *bed*; column 10, line 18, claim 15, for "distrbuting" read *distributing*; line 26, same claim, for "sequences" read *sequence*; and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*